July 13, 1948.                    A. SMIDT                     2,445,008
                                 CALCULATOR
Filed Oct. 29, 1946                                        4 Sheets-Sheet 1

INVENTOR.
ARNOLD SMIDT
BY
AGENT

July 13, 1948.   A. SMIDT   2,445,008
CALCULATOR
Filed Oct. 29, 1946   4 Sheets-Sheet 2

INVENTOR.
ARNOLD SMIDT
BY
AGENT

July 13, 1948.  A. SMIDT  2,445,008
CALCULATOR

Filed Oct. 29, 1946  4 Sheets-Sheet 3

INVENTOR.
ARNOLD SMIDT

BY

AGENT

July 13, 1948.  A. SMIDT  2,445,008
CALCULATOR
Filed Oct. 29, 1946  4 Sheets-Sheet 4

INVENTOR
ARNOLD SMIDT
BY
AGENT

Patented July 13, 1948

2,445,008

UNITED STATES PATENT OFFICE 2,445,008

CALCULATOR

Arnold Smidt, Elmhurst, N. Y.

Application October 29, 1946, Serial No. 706,463

9 Claims. (Cl. 235—64.7)

The present invention relates to a calculator and in particular to a depth-of-field calculator.

Such calculators or computing devices are known in dial or slide form, to be used with any lenses in cameras suitable for focusing and on certain cameras equipped with tables or scales. Whereas the latter are applicable only to the particular lens for which they are computed, the former have a complicated arrangement of scales and consequently a difficult reading.

It is the main object of the present invention to provide a calculator which permits rapid determination of any of a plurality of factors, as of the depth-of-field covered by lenses of various focal lengths and aperture settings and also of the respective distances the camera should be focused on.

It is another object of the invention to provide a depth-of-field calculator which comprises three dials and means holding together the three dials which are free to rotate relative to each other.

It is yet another object of the present invention to provide a calculator which permits direct reading of the factors which are to be found. With these and other objects which will become apparent in the following detailed description, the present invention will be clearly understood in connection with the accompanying drawings, in which.

Figure 7:
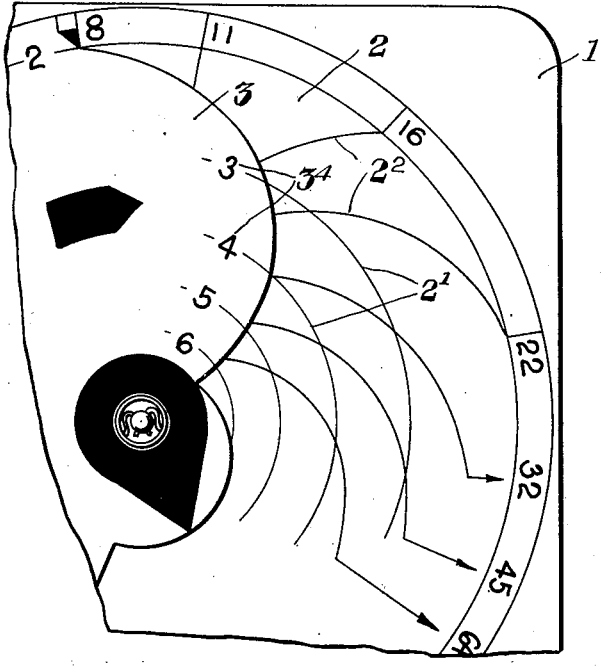
Fig. 7 is a plan view of a portion of all three dials in operational position of a further development.
Figure 4:
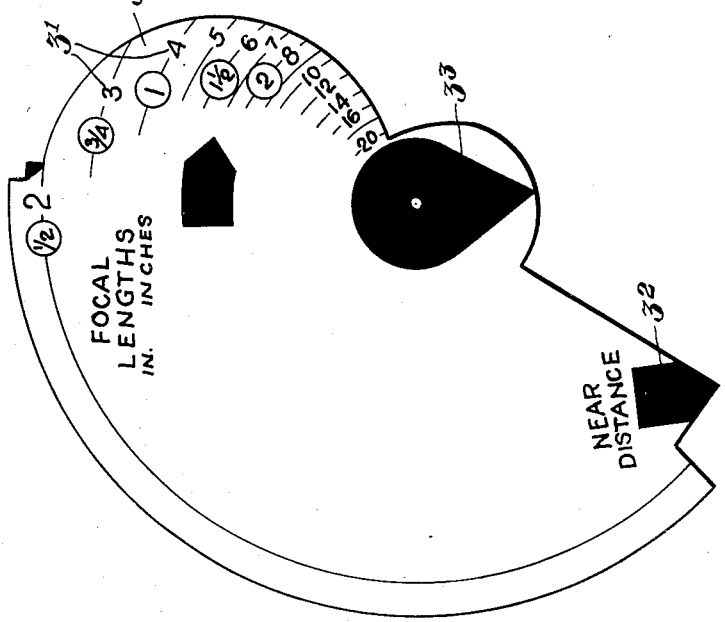
Fig. 4 is a plan view of the top dial.
Figure 3:
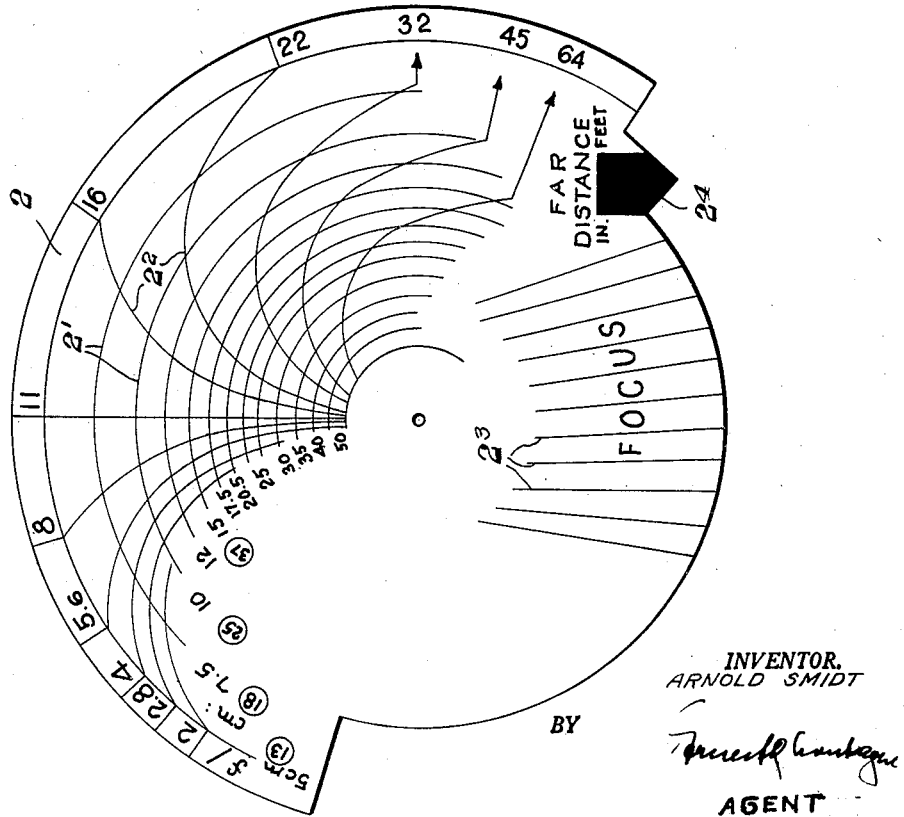
Fig. 3 is a plan view of the center dial.

The present invention, as disclosed in Figs. 1–6, is based on the well known principle that the depth-of-field of any lens is a function of the diameter of its effective aperture, which can be expressed by the equation:

$$\text{Hyperfocal distance} = dC$$

where $d$ is the diameter of the effective aperture lens and $C$ is the reciprocal of the diameter of the assumed circle of confusion as fraction of the focal length. The invention, as disclosed in Fig. 7, is a further development for certain purposes in which the circle of confusion is constant regardless of the focal length.

The calculator, one embodiment of which is shown by example in the drawings, comprises three dials, namely a bottom dial 1, a center dial 2, and a top dial 3. The three dials, which are made of cardboard, plastic or any suitable material, are held in a position free rotatable relative to each other by means of an eyelet or any convenient means.

The above stated equation gives the hyperfocal distance for any given diameter of the effective aperture of the lens, one half of which distance would constitute the near distance limit of sharpness with the far limit distance at infinity. The diameter $d$ of the aperture can be obtained by dividing the effective aperture or f/number into the focal length. By assuming, instead of the customary chosen $1/1000$ of the focal length, a slightly larger circle of confusion of $1/960$, it is possible to get a very simple set of near distance limits mostly composed of whole numbers which are proportionate to a series of successively smaller aperture diameters which are provided on the scale 1' of the dial 1, marked as "Normal scale."

By assuming a circle of confusion of $1/960$ of focal length the near distance limit for a lens of one inch diameter becomes 40 feet, one of a half inch diameter 20 feet, of one third inch diameter 13.3 feet and so on. The calibration of dials 2 and 3 could be simply accomplished by drawing radii at 12° intervals. On dial 1 the radii form the scale 1' and will be identical with the hyperfocal near distances.

A segment of dial 2 is provided with a plurality of sections of circles 2', each of the circles being drawn corresponding to a certain predetermined focal length and so spaced in logarithmic order that the circle presenting the shortest focal length is near the periphery of the dial. The dial 2 is also equipped with aperture lines $2^2$ which are plotted by dividing the focal lengths value into the aperture value and the thus arrived quotient represents the number of invisible radius line crossings on the focal length line, thereby yielding one plotted point. All plotted points are then connected to form the aperture curves or lines. Furthermore, the dial 2 is also equipped with focal point lines $2^3$ on its lower half which lines are plotted in such a way that every second line coincides at the periphery with a hyperfocal distance mark, since the lines $2^3$ are spaced apart 6° at the dial edge. Finally the dial 2 carries a far distance pointer $2^4$.

The top dial 3 has a scale $3^1$ for lenses of varying focal length and at its bottom a pointer $3^2$ for the near hyperfocal distance. In addition a focusing hand 3³ is provided at its center. The shape of the edge carrying the scale 3¹ determines the shape of the aperture curves or lines 2².

If the shape of the edge of disk 3 carrying the scale 3' is a radius line, the plotting of the aperture line 2² can be performed as stated above. However, if the shape of the edge of disk 3 carrying the scale 3' is a curve, a number of identical curves (not shown) are provided 12° apart on disk 2 and the plotting is performed by marking the cross points between the mentioned curves instead of the previous radii, and the focal length circles.

Figure 1:
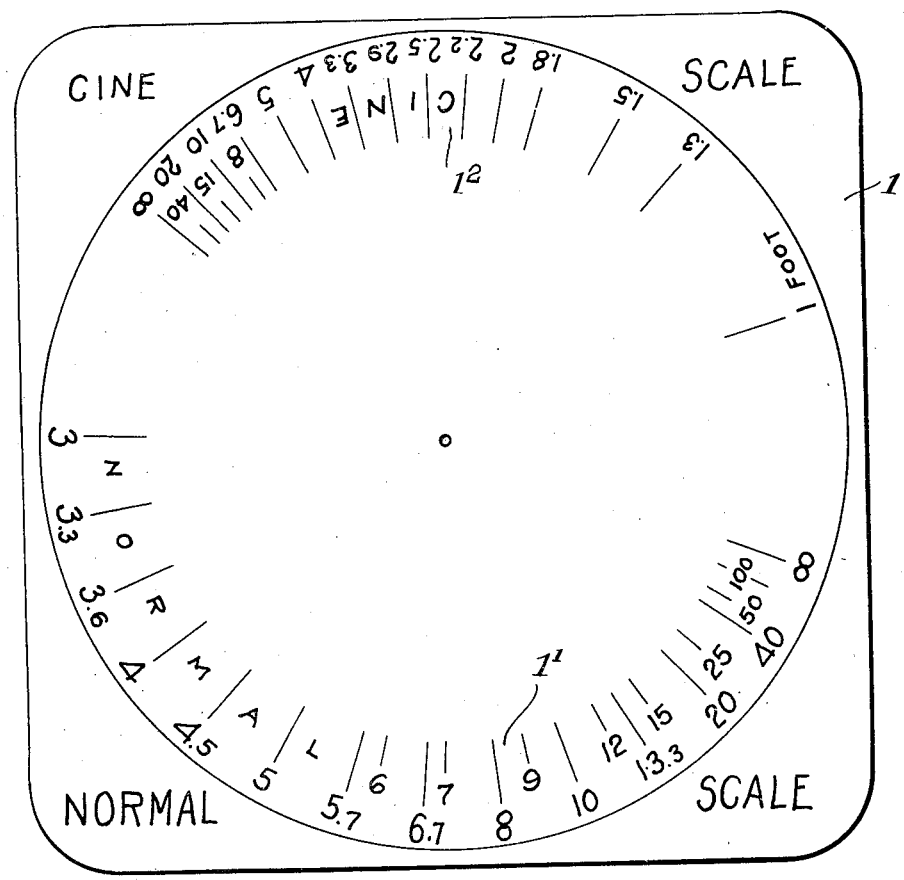
Figure 1 is a plan view of one embodiment of the bottom dial.

The bottom dial I as shown in Fig. 1 is provided with an alternate scale I² marked "Cine" by means of which lenses of very short focal length such as needed for normal cine work can be accommodated. This dial is used for readings whenever the circled alternate focal lengths on scale 3' of dial 3 are used. The "Cine" scale I² can be determined by spacing its distance nominations at ¼ of angular distance as compared with the distance nominations shown in the "Normal" scale I'.

Figure 2:
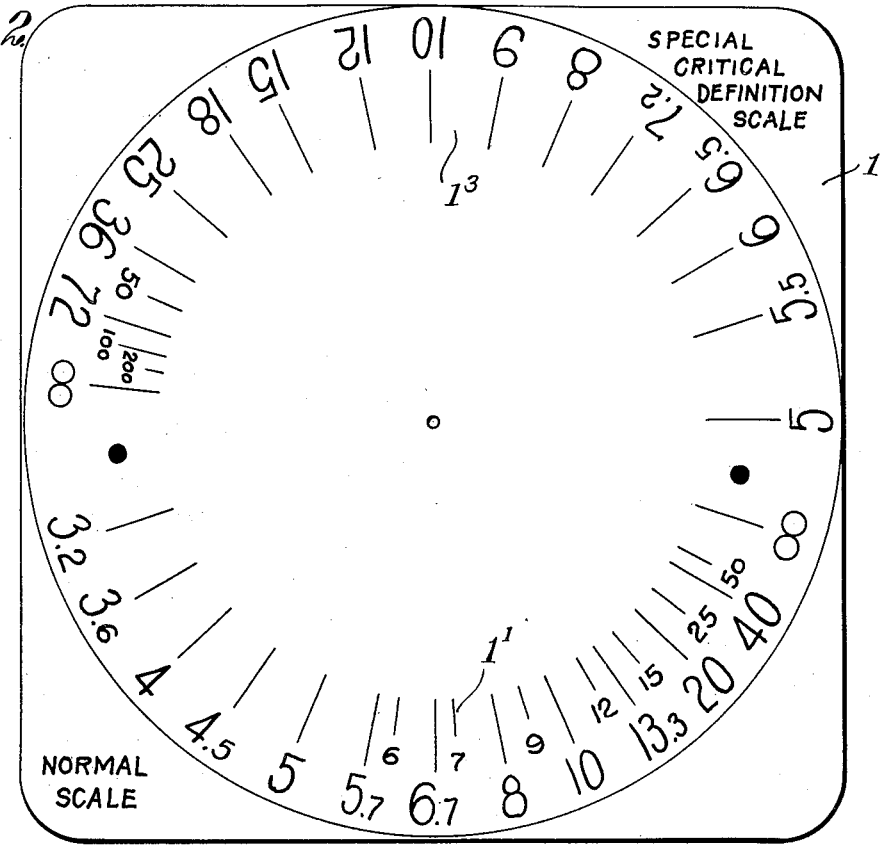
Fig. 2 is a plan view of a second embodiment of the bottom dial.

The bottom dial I as shown in Figure 2 is provided with an additional scale I³ of distances calculated on the basis of a smaller circle of confusion so as to achieve a more critical degree of definition. A circle of confusion of an arc of 2' which equals approximately ¹⁄₁₇₂₅ of the focal length is used for the scale I³. In the application in connection with the bottom dial I carrying the scale I³ the circled alternate focal lengths on scale 3¹ of dial 3 are not used.

After describing the calculator and in particular the arrangement of the different scales on the three dials I, 2 and 3, the operation of the calculator will be clearly understood as follows:

The main application of the calculator lies in the determination of the depth-of-field for a given lens in connection with a chosen aperture. Accordingly, dial 3 is first rotated relative to dial 2 until the focal length mark of the scale 3' corresponding to the lens of the used camera intersects with the aperture curve 2² representing the selected aperture. The relative rotation between the dials 2 and 3 brings about an angular position of the near distance pointer 3² and of the far distance pointer 2⁴ so as to be the equivalent of the depth-of-field existing under the circumstances. Then the dial I is rotated relative to the dials 2 and 3, the latter two remaining in their relative position which has been set before, by setting the camera focusing scale 2³ at the distance pointed at by the focusing hand 3³ in the center of dial 3. It is possible to choose the "Normal scale" or the "Cine scale" of the dial I, shown in Fig. 1, depending upon the size focal length of the lens used or the "Normal scale" or the Critical definition scale of the dial I shown in Fig. 2, depending upon the degree of sharpness wanted in the final negative to be taken.

From the above stated example it became clear that only two of five factors can be read from the calculator, the five factors being focal length, aperture, near distance, far distance and focusing distance. In the above example, it was assumed that the focal length was given by the used camera and the aperture was selected, which fixed two factors and the two remaining factors, namely, near and far distance determining the depth-of-field and the focusing distance could be read on the calculator.

It is clear, however, that the calculator can equally well be used to find the largest permissible aperture to cover a certain depth-of-field by setting dials 2 and 3 relative to dial I to a predetermined depth-of-field. Dials 2 and 3 will take such a relative position that the aperture corresponding to a given focal length of the used lens can be directly read off. If exchangeable lenses or cameras with different lenses are available a certain aperture can be selected and the lens having the required focal length can be read off.

Figure 5:
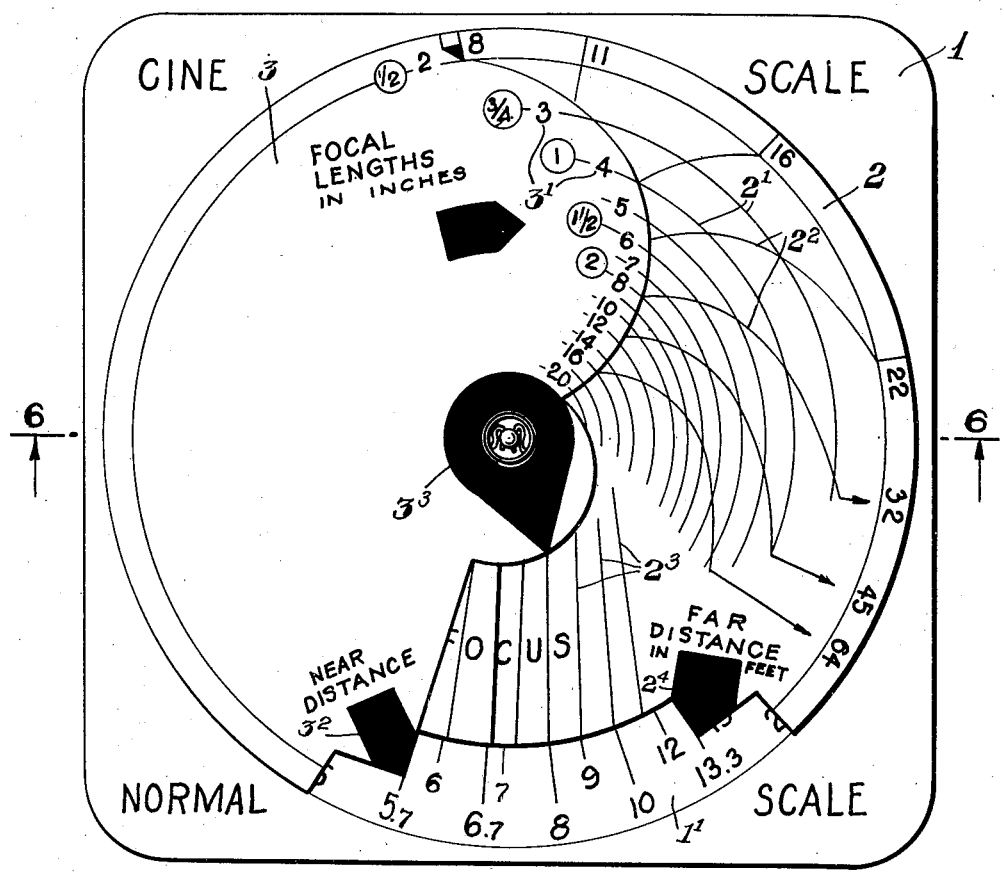
Fig. 5 is a plan view of all three dials in operational position.
Figure 6:
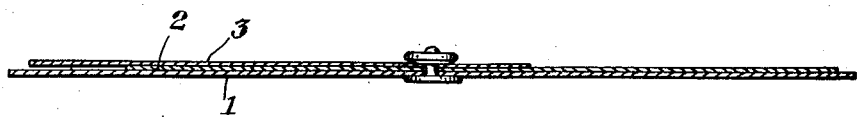
Fig. 6 is a sectional view of the calculator along the lines 6—6 of Fig. 5.

In Fig. 5 a practical example of the use of the calculator is given. It is assumed that the lens of the used camera has a focal length of 4" and an aperture of f/16 is selected. Dials 2 and 3 are accordingly set that the focal length point 4" intersects the f/16 curve. Should the camera be focused at 8 feet the 8 foot mark on dial I should be moved opposite the other end of the focus line 2³ the focus hand 3³ points at or be brought into the same relative position should the hand be pointing between lines. At this setting the hand points directly at the line so that the 8 foot mark should be lined up with the other end. It will then be found that the near distance pointer lines up with 5.7 feet and the far distance pointer with 13.3 feet.

Fig. 5 discloses clearly that lenses of a 2" focal length at f/8, of 4" focal length to f/16, of 8" focal length at f/32, and of 16" focal length at f/64 have identical depth-of-field coverage.

Fig. 7 shows an alternate arrangement by providing a scale 3⁴ and focal length lines 2' based on a constant and specific circle of confusion regardless of focal length showing the dials 2 and 3 in the same relative position to each other as shown with the first described embodiment in Fig. 5, but with the scales 3⁴ and lines 2' rearranged to provide constant circle of confusion of approximately ⅟₅₀₀ inch without changing the aperture lines or other calibrations. This is accomplished by finding the ratio between the specific circle of confusion wanted and that obtained by taking ⅟₁₀₀₀ of the focal length. The relative position of the focal length to be plotted is determined by multiplying the focal length under consideration with this ratio and using the result to occupy the same relative position as a focal length line based on a circle of confusion of ⅟₁₀₀₀ of the focal length. In the example shown in Fig. 7 the shift of the focal length lines is accomplished as follows:

| Focal length to be plotted, with circle of confusion of ⅟₅₀₀ inch | 2" | 3" | 4" | 5" | 6" |
|---|---|---|---|---|---|
| Circle of confusion on basis of ⅟₁₀₀₀ of focal length | ⅟₅₀₀ | ⅟₃₃₃ | ⅟₂₅₀ | ⅟₂₀₀ | ⅟₁₆₆ |
| Ratio between circle of confusion of ⅟₁₀₀₀ to that of ⅟₅₀₀ inch | 1 | 1.5 | 2 | 2.5 | 3 |
| Location of new focal length line on scale 3⁴ (Fig. 7) relative to scale 3' (Fig. 5) | Same | 4.5" | 8" | 12.5" | 18" |

Therefore it will be seen according to Fig. 7 that when the circle of confusion is to remain constant at ⅟₅₀₀ inch a 2" lens at f/8 has the same depth-of-field coverage as a 4" lens at f/32.

While I have described several embodiments of my invention, it is to be understood that these embodiments are given by way of example only and not as limiting the scope of the invention as set forth in the objects and the appended claims.

I claim:

1. A calculator for determining proper relationship between focal lengths, aperture openings and depth-of-field, comprising at least three discs and means for connecting said discs concentrically and rotatably relative to each other, one of said discs having a scale of distances based on a predetermined circle of confusion, another of said discs having aperture opening designations, focus lines and a pointer determining one of the depth-of-field limits, a third of said discs having focal length designations, a pointer determining the other of the depth-of-field limits and another pointer determining the focus distance, said focus lines of said another disc correlating said another pointer of said third disc with the distance scale of said one disc, whereby by proper setting of the aperture opening designations of said another disc with the focal length designations of said third disc the depth-of-field may be determined.

2. A calculator according to claim 1, in which the circle of confusion, on which the scale of distances on said one disc is based, is 1/960 of the focal length.

3. A calculator according to claim 1, in which said one disc has at least one additional scale of distances based on an additional focal length scale of said third disc.

4. A calculator according to claim 1, in which said one disc has at least one additional scale of distances based on a predetermined circle of confusion different from that on which said first scale of distances is based.

5. A calculator according to claim 1, in which said another disc has in addition concentric circular focal length lines corresponding to the focal length scale of said third disc all of which are calculated to provide the same relative circle of confusion in terms of focal lengths.

6. A calculator according to claim 1, in which said another disc has in addition concentric circular focal length lines all calculated to provide one circle of confusion of specific size regardless of focal length.

7. A calculator for determining proper relationship between focal lengths, aperture openings and depth-of-field, comprising three discs and means for connecting said three discs concentrically and rotatably relative to each other, the first of said discs having two distance scales each based on a predetermined circle of confusion, the second of said discs having aperture opening designations, focus lines and a pointer determining the far distance limit of the depth-of-field, the third of said discs having a focal length scale, a pointer determining the near distance limit and another pointer determining the focus distance, said focus lines of said second disc correlating said another pointer of said third disc with either one of said distance scales of said first disc, whereby by proper setting of either three of the five factors comprising focal length, aperture, focusing distance, and near distance and far distance thereby determining the depth-of-field corresponding to the predetermined circle of confusion, the two remaining factors may be determined.

8. A calculator for determining proper relationship between focal lengths, aperture openings and depth-of-field, comprising at least three scale carriers and means for connecting said scale carriers for relative movement to each other, the first of said scale carriers having a scale of distances based on a predetermined circle of confusion, the second of said scale carriers having focal lines and a pointer determining one of the depth-of-field limits, and the third of said scale carriers having another pointer determining the other of the depth-of-field limits and a third pointer determining the focus distance, one of the two last mentioned scale carriers having aperture opening designations and the other of said two last mentioned scale carriers having focal length designations, said focus lines of said second scale carrier correlating said third pointer with the distance scale of said first scale carrier, whereby the proper setting of the aperture opening designations with the focal length scale the depth-of-field may be determined.

9. A calculator for determining proper relationship between focal lengths, aperture openings and depth-of-field, comprising at least three discs and means for connecting said discs concentrically and rotatably to each other, the first of said discs having a scale of distances based on a predetermined circle of confusion, the second of said discs having focus lines and a pointer determining one of the depth-of-field limits, and the third of said discs having another pointer determining the other of the depth-of-field limits and a third pointer determining the focus distance, one of the two last mentioned discs having aperture opening designations and the other of said two last mentioned discs having focal length designations, said focus lines of said second disc correlating said third pointer with the distance scale of said first disc, whereby the proper setting of the aperture opening designations with the focal length scale the depth-of-field may be determined.

ARNOLD SMIDT.